US012107859B2

(12) United States Patent
Miriyala et al.

(10) Patent No.: US 12,107,859 B2
(45) Date of Patent: *Oct. 1, 2024

(54) ROLE-BASED ACCESS CONTROL POLICY AUTO GENERATION

(71) Applicant: Juniper Networks, Inc., Sunnyvale, CA (US)

(72) Inventors: Prasad Miriyala, San Jose, CA (US); Sajeesh Mathew, Saratoga, CA (US); Kannan Varadhan, San Jose, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,893

(22) Filed: Feb. 9, 2023

(65) Prior Publication Data
US 2023/0188526 A1 Jun. 15, 2023

Related U.S. Application Data

(63) Continuation of application No. 16/836,410, filed on Mar. 31, 2020, now Pat. No. 11,595,393.

(51) Int. Cl.
*H04L 9/40* (2022.01)
*G06F 21/62* (2013.01)
*H04L 29/06* (2006.01)

(52) U.S. Cl.
CPC ........ *H04L 63/101* (2013.01); *G06F 21/6209* (2013.01); *H04L 63/20* (2013.01)

(58) Field of Classification Search
CPC ..... H04L 63/101; H04L 63/20; H04L 63/102; H04L 63/104; G06F 21/6209; G06F 21/62; G06F 21/6218; G06F 21/629
See application file for complete search history.

(56) References Cited

U.S. PATENT DOCUMENTS

| 8,161,173 B1 | 4/2012 | Mishra et al. |
| 9,571,394 B1 | 2/2017 | Sivaramakrishnan et al. |

(Continued)

FOREIGN PATENT DOCUMENTS

| CN | 104580344 A | 4/2015 |
| CN | 108292346 A | 7/2018 |

(Continued)

OTHER PUBLICATIONS

Extended Search Report from counterpart European Application No. 20179991.3, dated Dec. 11, 2020, 9 pp.

(Continued)

*Primary Examiner* — Edward Zee
(74) *Attorney, Agent, or Firm* — Shumaker & Sieffert, P.A.

(57) ABSTRACT

In some examples, an access control policy controller in a computer network may receive a request to create an access control policy that permits a role to perform one or more functions in the computer network. The access control policy controller may determine one or more operations performed on one or more objects in the computer network to perform the one or more functions based at least in part on tracking performance of the one or more functions in the computer network. The access control policy controller may create the access control policy for the role that permits the role to perform the one or more operations on the one or more objects in the computer network.

20 Claims, 3 Drawing Sheets

(56) References Cited

U.S. PATENT DOCUMENTS

| | | | |
|---|---|---|---|
| 9,942,148 | B1 | 4/2018 | Sivaramakrishnan et al. |
| 10,122,757 | B1 | 11/2018 | Kruse et al. |
| 10,291,497 | B2 | 5/2019 | Mehta et al. |
| 10,728,121 | B1 | 7/2020 | Chitalia et al. |
| 10,944,691 | B1 | 3/2021 | Raut et al. |
| 10,999,251 | B2 | 5/2021 | Miriyala et al. |
| 11,394,750 | B1 | 7/2022 | Isberner et al. |
| 11,595,393 | B2 | 2/2023 | Miriyala et al. |
| 2002/0144142 | A1 | 10/2002 | Shohat |
| 2004/0064343 | A1* | 4/2004 | Korpman ............... G16H 50/20 600/300 |
| 2013/0326579 | A1 | 12/2013 | Bhatti et al. |
| 2014/0094159 | A1 | 4/2014 | Raleigh et al. |
| 2014/0109168 | A1* | 4/2014 | Ashley ................... H04L 63/20 726/1 |
| 2015/0163252 | A1* | 6/2015 | Bhatti ..................... G16H 10/60 726/1 |
| 2016/0212169 | A1 | 7/2016 | Knjazihhin et al. |
| 2017/0295181 | A1 | 10/2017 | Parimi et al. |
| 2018/0288002 | A1 | 10/2018 | Petrick et al. |
| 2019/0014124 | A1 | 1/2019 | Reddy et al. |
| 2019/0158541 | A1 | 5/2019 | Miriyala et al. |
| 2019/0273683 | A1 | 9/2019 | Jiang et al. |
| 2019/0342304 | A1 | 11/2019 | Weintraub et al. |
| 2020/0137113 | A1 | 4/2020 | Thomas |
| 2022/0019455 | A1 | 1/2022 | Cao et al. |
| 2022/0321495 | A1 | 10/2022 | Liu et al. |

FOREIGN PATENT DOCUMENTS

| | | | |
|---|---|---|---|
| CN | 110519224 | A | 11/2019 |
| EP | 3611619 | A1 | 2/2020 |
| EP | 3617879 | A1 | 3/2020 |
| EP | 3629533 | A1 | 4/2020 |
| WO | 2013184846 | A1 | 12/2013 |
| WO | 2017064560 | A1 | 4/2017 |

OTHER PUBLICATIONS

First Office Action and Search Report, and translation thereof, from counterpart Chinese Application No. 202010528849.1 dated Oct. 31, 2022, 14 pp.

Kn et al., "Day One: Contrail DPDK vRouter," Juniper Networks, Retrieved from: https://www.juniper.net/documentation/en_US/day-one-books/contrail-DPDK.pdf, Jan. 21, 2021, 194 pp.

Li et al., "Mobile In-store Personalized Services," IEEE, 2009 IEEE International Conference on Web Services, Jul. 6-10, 2009, pp. 727-734.

Noghani et al., "Automating Ethernet VPN deployment in SDN-based Data Centers," IEEE, 2017 Fourth International Conference on Software Defined Systems (SDS), May 8-11, 2017, pp. 61-66.

Petculescu "Context Based Access Control in Pervasive Environments," IEEE, 2012 Fourth International Conference on Intelligent Networking and Collaborative Systems, Sep. 19-21, 2012, pp. 515-519.

Prosecution History from U.S. Appl. No. 16/836,410, now issued U.S. Pat. No. 11,595,393, dated Jun. 16, 2022 through Jan. 31, 2023, 32 pp.

Response to Extended Search Report dated Dec. 11, 2020, from counterpart European Application No. 20179991.3 filed Apr. 5, 2022, 25 pp.

U.S. Appl. No. 17/808,970, filed Jun. 24, 2022, naming inventors Miriyala et al.

Yadav, Parth, and Vipin Kumar Rathi. "KupenStack: Kubernetes based Cloud Native OpenStack." arXiv preprint arXiv:2106.02956 (Year: 2021), 11 pp.

Yilmaz, Onur. "Chapter 4—Extending the Kurbernetes API". Excerpt from Extending Kubernetes. apress (Year: 2021), 43 pp.

* cited by examiner

ROLE-BASED ACCESS CONTROL POLICY AUTO GENERATION

RELATED APPLICATION

This application is a continuation of U.S. application Ser. No. 16/836,410, filed Mar. 31, 2020, the entire contents of which is incorporated herein by reference.

TECHNICAL FIELD

The disclosure relates to computer networks and, more specifically, to access control policies for computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices. Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

The data center may, for example, physically house all of the infrastructure equipment, such as networking and storage systems, redundant power supplies, and environmental controls. In a typical data center, clusters of storage systems and application servers are interconnected via a switch fabric provided by one or more tiers of physical network switches and routers. More sophisticated data centers provide infrastructure spread throughout the world with subscriber support equipment located in various physical hosting facilities. In many examples of data centers, the infrastructure may include a combination of the physical devices that are linked to and communicate with a variety of virtual resources such as virtual servers, agents, and/or policy controllers.

SUMMARY

In general, the disclosure describes techniques that enable a controller of a computer network to generate role-based access control (RBAC) policies for the computer network based on user intents. A user, such as an administrator of the computer network, may specify one or more user intents, where user intent may be a high-level description of an end functionality of the computer network. The controller may determine the objects in the computer network that are operated upon in order to perform the one or more user intents and may determine the specific operations performed on the identified objects in order to perform the one or more user intents. The controller may therefore determine an access control policy for a role that permits the role to perform the specific operations on the identified objects.

A computer network, such as a software-defined network, may be a complex environment that includes hundreds or thousands of physical and/or virtual components such as applications, virtual machines, virtual routers, virtual networks, subnets, domains, tenants, resources, and the like that communicate with each other as well as with external devices. As such, it may be impracticable for a user (e.g., an administrator) to manually determine the appropriate access control policies for a role that permits the role to perform one or more user intents within the computer network. For example, performing a workflow that includes one or more user intents may include performing operations to monitor and orchestrate resources across clusters, domains, tenants, virtual networks, and the like. Further, these entities may span across multiple virtual routers, nodes (e.g., config nodes, control nodes, etc.), virtual machines, and the like. Thus, in some examples, performing a workflow that includes one or more user intents may include accessing and performing operations on hundreds of different objects across multiple servers of a network. Thus, in some cases, the user may be unable to manually determine the appropriate access control policies for a role.

In some examples, if a user attempts to manually determine an access policy for a role to perform one or more intents, a user may be overinclusive or underinclusive in manually determining an access policy that grants a role the ability to perform the one or more intents in the computer network. For example, if a user determines that performing a user intent includes performing an operation on an object in the computer network but does not know the specific operations performed on the object in order to perform the user intent, the user may grant a role the ability to perform operations on an object that may not be required in order to perform the user intent in the computer network, which may lead to security issues in that a user associated with the role may be permitted to perform operations other than those required to perform the user intent. In other examples, a user may, by mistake, not grant a role the ability to perform one or more operations that may need to be performed in order to perform a user intent, which may lead to the role being unable to perform the user intent with the permissions granted by the user.

As such, the techniques described herein may provide for one or more technical advantages that lead to at least one practical application. For example, by identifying the objects that are operated upon in order to perform the one or more user intents and by determining the specific operations performed on the identified objects, a controller of a computer network may be able to create an access policy for a role to perform one or more intents that enables a role to perform the specific operations on the specific objects in the computer network to perform the one or more user intents while preventing the role from performing operations on objects in the computer network that are not required to perform the one or more user intents. As such the techniques described herein may improve the security of the computer network, when granting a role permission to perform operations on objects in order to perform one or more intents, by preventing mistakenly or accidentally granting permissions to the role to perform operations on objects that may not be required to perform one or more user intents.

In one example, a method includes receiving a request to create an access control policy that permits a role to perform one or more functions in a network. The method further includes determining one or more operations performed on one or more objects in the network to perform the one or more functions based at least in part on tracking performance of the one or more functions in the network. The method further includes creating the access control policy for the role that permits the role to perform the one or more operations on the one or more objects in the network.

In another example, a device includes a memory configured to store one or more access control policies. The network device further includes processing circuitry operably coupled to the memory and configured to: receive a request to create an access control policy that permits a role to perform one or more functions in a network; determine one or more operations performed on one or more objects in the network to perform the one or more functions based at least in part on tracking performance of the one or more functions in the network; and create the access control policy for the role that permits the role to perform the one or more operations on the one or more objects in the network.

In another example, a computer-readable medium includes instructions that, when executed, cause processing circuitry executing an access control policy controller for a network to: receive a request to create an access control policy that permits a role to perform one or more functions in the network; determine one or more operations performed on one or more objects in the network to perform the one or more functions based at least in part on tracking performance of the one or more functions in the network; and create the access control policy for the role that permits the role to perform the one or more operations on the one or more objects in the network.

The details of one or more examples are set forth in the accompanying drawings and the description below. Other features, objects, and advantages will be apparent from the description and drawings, and from the claims.

DETAILED DESCRIPTION

Figure 1:
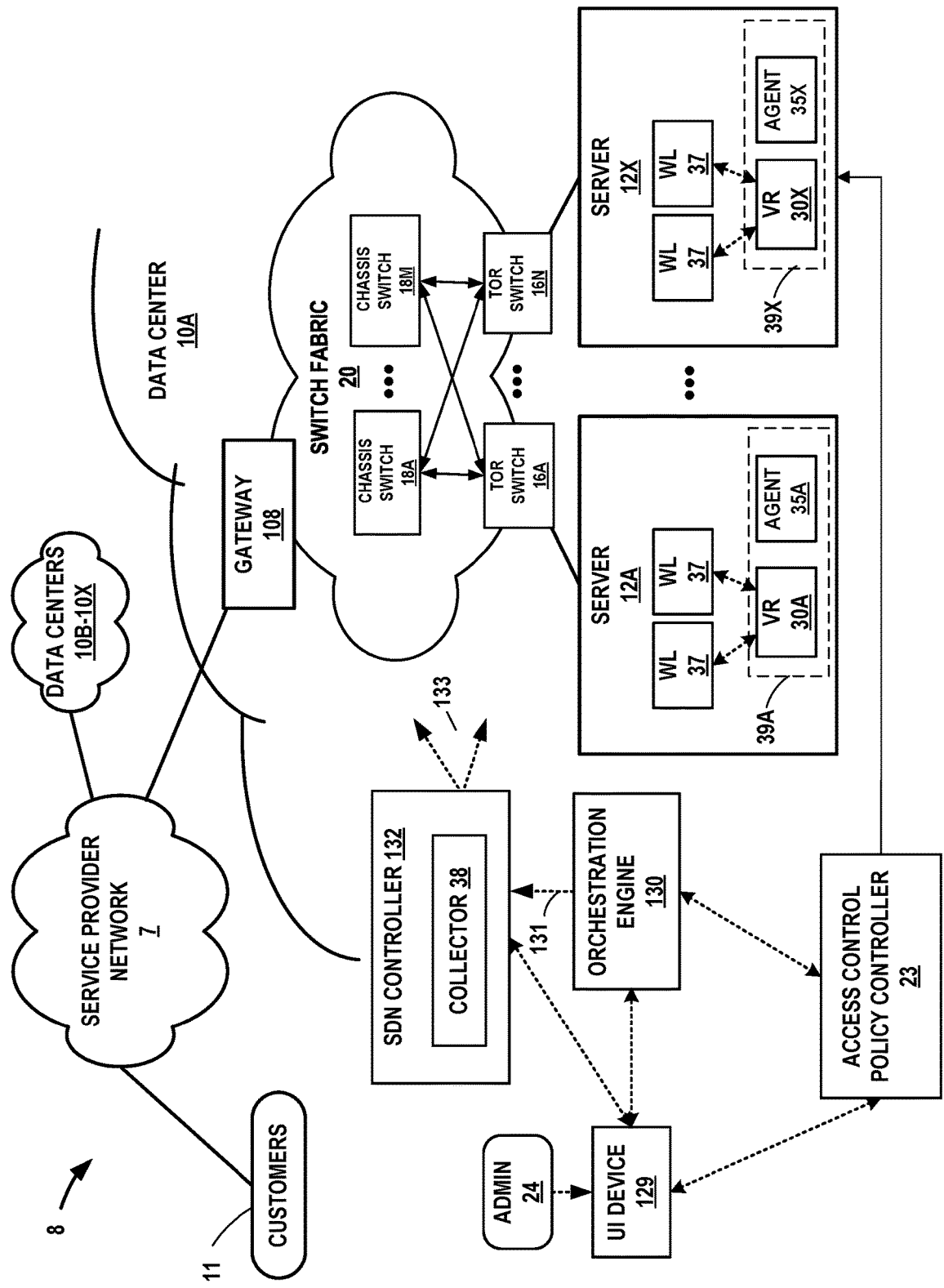
FIG. 1 is a block diagram illustrating an example computer network system in accordance with techniques described herein.

FIG. 1 is a block diagram illustrating an example computer network system 8 in accordance with techniques described herein. Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads 37 (indicated as "WL" in FIG. 1). As described herein, the terms "application workloads 37" or "workloads 37" may be used interchangeably to refer to application workloads 37. Workloads 37 may execute on a virtualized environment, such as a virtual machine, a container, or some of type of virtualized instance, or in some cases on a bare metal server that executes the workloads directly rather than indirectly in a virtualized environment.

Each of servers 12 may be alternatively referred to as a host computing device or, more simply, as a host. A server 12 may execute one or more of workloads 37 on one or more virtualized instances, such as virtual machines, containers, or other virtual execution environment for running one or more services (such as virtualized network functions (VNFs)). Some or all of the servers 12 can be bare metal servers (BMS). A BMS can be a physical server that is dedicated to a specific customer or tenant.

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via APIs such as a northbound API 131, which in turn operates in response to configuration input received from an administrator 24 operating user interface device 129. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers that extend the network from physical routers and switches in the data center switch fabric into a virtual overlay network hosted in virtualized servers.

In some examples, SDN controller 132 manages the network and networking services such load balancing, security, and allocate resources from servers 12 to various applications via a southbound API. That is, a southbound API represents a set of communication protocols utilized by SDN controller 132 to make the actual state of the network equal to the desired state as specified by orchestration engine 130. One such communication protocol may include a messaging communications protocol such as XMPP, for example. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual router (VR) 30A-30X or agents 35A-35X ("AGENT" in FIG. 1) on each of servers 12A-12X.

As described herein, each of servers 12 include a respective forwarding component 39A-39X (hereinafter, "forwarding components 39") that performs data forwarding and traffic statistics collection functions for workflows ("WFs 37" of FIG. 1) executing on each server 12. In the example of FIG. 1, each forwarding component is described as including a virtual router ("VR 30A-VR 30X" in FIG. 1) to perform packet routing and overlay functions, and a VR agent ("VA 35A-35X" in FIG. 1) to communicate with SDN controller 132 and, in response, configure the virtual routers 30. VR agents 35 operate as respective policy agents for respective servers 12 and may alternatively be referred to as policy agents. Alternatively, a policy agent may correspond to a sub-component or function of a VR agent 35.

In this example, each virtual router 30A-30X implements at least one routing instance for corresponding virtual networks within data center 10 and routes the packets to appropriate virtual machines, containers, or other elements executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via a southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

Virtual routers (virtual router 30A to virtual router 30X, collectively "virtual routers 30" in FIG. 1) execute multiple routing instances for corresponding virtual networks within data center 10A and routes the packets to appropriate workload 37 executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

Data center 10A can have thousands of chassis switches 18 and TOR switches 16, and hundreds of servers 12. Further, the servers 12 in data center 10A may include many different objects such as virtual networks, domains, subnets, clusters, tenants, applications, resources, projects, services (e.g., Internet Protocol address management), and the like. The example illustrated in FIG. 1 represents a fully configured data center 10A. Other data centers 10B-10X may be similarly configured and may include a similar number of chassis switches, TOR switches, servers, and objects. Other configuration objects configurable in data center 10A devices may include access control lists, alarms, IP aliases, IP pool aliases, analytics nodes, API access lists, BGP-asa-service, BGP routers, configuration nodes, configuration roots, customer attachments, database nodes, discovery services, Discovery Service Assignment (DSA) rules, floating IPs, floating IP pools, forwarding classes, Quality-of-Service parameters, global systems, global vrouters, IP instances, interface route tables, load balancers, logical interfaces, logical routers, namespaces, IPAMs, network policies, physical interphases, physical routers, ports, projects, provider attachments, aggregate routes, route tables, route targets, routing instances, routing policies, security groups, service appliances or sets thereof, service instances, domain name service (DNS) servers and other DNS parameters, virtual IP addresses, virtual machines and interfaces thereof, and virtual routers.

Role-based access control (RBAC) may be one role-based technique for restricting and monitor users' access within network system 8. Network system 8 (e.g., via access control policy controller 23) may be configured with one or more roles, each of which may be assigned to one or more users. Roles assigned to a user may determine services provided to the user, applications the user is permitted to access within network system 8, admin privileges the user has within network system 8, or any combination thereof. Each role may be associated with an access control policy that specifies the associated role's permission to perform certain operations and/or access certain objects within network system 8. For example, an access control policy for a role may specify one or more objects within network system 8 that the role is allowed to perform one or more operations and that may also specify, for each of the one or more objects specified in the policy, the one or more operations that the role is allowed to perform on the object.

In some examples, an access control policy for a role may specify, for one or more objects in network system 8, one or more of create, read, update, and delete (CRUD) operations that the role is permitted to perform on the object. In some examples, an access control policy may act as a whitelist in that the access control policy may specify the objects and/or operations that the role is able to access and/or perform, but may refrain from specifying the objects and/or operations that the role is not able to access. For example, if an access control policy does not specify a particular object within network system 8, then the role associated with the access control policy may not be able to perform any operations on the object. In another example, if an access control policy specifies one or more operations that the role is able to perform on an object within network system 8, but does not specify a particular operation that the role is able to perform on the object, then the role associated with the access control policy may only be able to perform the one or more specified operations on the object but may not be able to perform the particular operation on the object.

In some examples, administrator 24 may manually create and/or modify access control policies for roles in order to specify the objects within network system 8 that the role is permitted to access and the operations that the role is permitted to perform on those specified objects. Administrator 24 may interact with a user interface, such as a graphical user interface, that is presented by user interface device 129, such as by providing user input at user interface device 129, to specify, for a role, permissions to access objects and perform operations within network system 8. For example, administrator 24 may provide user input to select one or more objects in network system 8 on which the role is permitted to perform one or more operations and may provide input to specify one or more operations, such as one or more of CRUD operations, for each of the objects selected by administrator 24.

While manually creating access control policies for generic high-level roles such as for a cloud administrator or a tenant administrator may be relatively easy and straightforward because administrator 24 may be able to simply specify that a role for a cloud administrator is permitted to perform all of the CRUD operations on all objects in, for example, network system 8 in the case of a role for a cloud administrator or a particular tenant in the case of a tenant administrator, it may be harder for administrator 24 to manually create more fine-grained access control policies at the individual object level in network system 8.

For example, some functions performed by network system 8 may include performing operations on tens, hundreds, or thousands of different objects within network system 8. As such, administrator 24 may have to manually select the access control policies for tens, hundreds, or thousands of objects within network system 8 in order to create an access control policy for a role that performs such functions. Further, because users of network system 8 may specify functions to be performed by network system 8 as one or more user intents that are high-level descriptions of end functionalities of the network system 8, users of network system 8 may not have visibility into all of the operations that network system 8 may perform in order to perform such one or more user intents. As such, it may be impractical for users of network system 8 to manually create access control policies for roles that permit roles to perform some functions within network system 8 by manually setting the permitted operations on tens, hundreds, or thousands of objects across network system 8.

In accordance with aspects of the present disclosure, components of network system 8 such as access control policy controller 23 may create access control policies that permit roles to access objects and perform operations on objects in network system 8. Access control policy controller 23 may be able to create such access control policies for roles without administrator 24 having to specify the exact objects that roles are permitted to access and the exact operations that roles are permitted to perform on each of the objects. Instead, a user with elevated privileges, such as administrator 24 of network system 8 or of a particular domain, cluster, tenant, and the like within network system 8, may send a request to access control policy controller 23 to create an access control policy that permits a role to perform one or more functions in network system 8.

Access control policy controller 23, in some examples, may be an analytics engine of network system 8, may determine one or more operations to be performed on one or more objects in network system 8 in order to perform the one or more functions and may generate an access control policy for the role that permits the associated role to perform the one or more operations on the one or more objects. Access control policy controller 23 may therefore generate an access control policy for the role that specifies the one or more operations that the role is permitted to perform on one or more objects in network system 8.

In the example of FIG. 1, administrator 24 may request that an access control policy to be created for a role by data center 10A that permits the role to perform one or more functions in network system 8 by providing indications of the one or more functions that the role is permitted to perform. For example, administrator 24 may provide user input at user interface device 129 to specify one or more functions that a role is permitted to perform.

In some examples, administrator 24 may specify the one or more functions as one or more user intents via user interface device 129. A user intent may be a high-level description or abstraction of a configuration state of data center 10A or of an end functionality of data center 10A that does not specify the low level details (e.g., the specific objects in network system 8 on which operations are performed and the specific one or more CRUD operations to be performed on the objects) of how the configuration state of data center 10A is achieved and/or how the particular end functionality is implemented in network system 8. For example, administrator 24 may specify a user intent that describes creating a policy between two or more networks, such as between two or more of data centers 10, between service provider network 7 and another network within network system 8, between two other networks, and the like. To perform the user intent to create the policy between the two or more networks, network system 8, (e.g., data center 10A and/or SDN controller 132) may create two or more networks, create one or more policies for the two or more networks, and attach the policies to the two or more networks. For example, data center 10A and/or SDN controller 132 may create and/or perform operations on multiple different objects within network system 8, such as creating and/or performing one or more CRUD operations on each of routing instances, access control lists, access control entries, virtual routing and forwarding instances, and the like in order to perform the user intent specified by administrator 24.

In another example, if a user intent describes creating a tunnel between two points of presence within data center 10A, data center 10A may perform the user intent by determining the implementation details of the end functionality, such as determining whether to use a single tunnel or to use multiple tunnels between the two points of presence, determining which specific hardware tables or software features are used, and the like, and implementing the end functionality (e.g., the tunnel described by the user intent) according to the implementation details determined data center 10A. Other examples of user intents that administrator 24 may specify may include higher level use cases which may cause even more object type manipulation, such as a user intent for performing service chaining, which data center 10A, SDN controller 132, and the like may perform by performing operations on objects such as service templates, service instances, networks, network policies, access control lists, access control entries, routing instances, and the like.

In some examples, administrator 24 may specify one or more user intents by specifying one or more workflows via user interface device 129, where one or more intents and/or one or more objects may be used to create a workflow. Workflows as well as intents may each be associated with a workflow identifier or a user intent identifier, so that the workflows and/or user intents specified by administrator 24 may be sent to an API server of, for example, SDN controller 132 so that SDN controller 132 may be able to associate a workflow identifier or a user intent identifier to the objects created and/or manipulated in order to perform the workflow or user intent.

In some examples, administrator 24 may also specify a role associated with the access control policy. By specifying a role associated with the access control policy, the access control policy that is generated based at least in part on the one or more functions specified by administrator 24 may define the operations that users assigned to the role are permitted to perform in data center 10A.

In some examples, administrator 24 may also specify a time period associated with the one or more functions specified by administrator 24 to indicate to data center 10A the time period during which the one or more functions are to be performed by data center 10A. In some examples, administrator 24 may specify a time period by specifying a start time and an end time, to indicate that the one or more functions are to be performed by data center 10A between the specified start time and end time.

In some examples, administrator 24 may also specify a scope of the access control policy that is to be created. The scope may indicate the portions of network system 8 to which the access control policy applies. In some examples, administrator 24 may specify a global scope that applies the access control policy to the entirety of data center 10A. In some examples, administrator 24 may specify a tenant associated with the access control policy. In the cases where data center 10A comprises a multitenant system, administrator 24 may specify a tenant out of the multitenant system for which data center 10A may create an access control policy to control the one or more operations that the role is permitted to perform on one or more objects in the tenant based on the one or more functions specified by administrator 24. In some other examples, data center 10A may specify a project-level scope so that the access control policy is applied to a particular project within data center 10A.

In some examples, user interface device 129 may provide a user interface, such as a graphical user interface that includes various user interface controls such as input fields, drop down fields, and the like that a user such as administrator 24 may interact with via user input to provide the information described above in order send a request to access control policy controller 23 to create an access control policy that permits a role to perform one or more functions in network system 8. For example, administrator 24 may provide input via user interface device 129 to specify a role, a tenant, one or more functions to be performed by data center 10A, a start time, an end time, as well as any other suitable information.

In some examples, upon administrator 24 providing user input to provide the information described above, user interface device 129 may provide a confirmation user interface that allows administrator 24 to confirm the information that has been entered is correct and allows administrator 24 to make modifications to the request to create an access policy before the request is sent to access control policy controller 23. In response to receiving confirmation from administrator 24, user interface device 129 may send the request to create the access control policy controller 23.

Access control policy controller 23 may, in response to receiving an indication of the one or more functions to be performed by data center 10A, forward the one or more functions to SDN controller 132. SDN controller 132 may determine one or more operations performed on one or more objects in data center 10A to perform the one or more functions based at least in part on tracking performance of the one or more functions in data center 10A. In some examples, SDN controller 132 may direct components of data center 10A, such as servers 12, to perform the functions specified by administrator 24 in order to determine the one or more operations performed on one or more objects in data center 10A to perform the one or more functions.

In some examples, SDN controller 132 and/or orchestration engine 130 may receive the one or more functions specified by administrator 24, such as from access control policy controller 23, and SDN controller 132 may, in response, determine one or more API calls for performing the one or more functions. For example, such API calls may include one or more representational state transfer (REST) API calls or any other suitable API calls that may be executed by an API server of SDN controller 132 and/or other components of data center 10A.

To execute the API calls, SDN controller 132 may act to control the components of data center 10A, such as gateway 108, chassis switches 18, TOR switches 16, servers 12, workloads 37, virtual routers 30, agents 35, forwarding components 39, virtual machines, containers, hypervisors, policies, applications, services, and the like in order to perform the functions of the API calls. For example, in response to receiving a user intent for data center 10A to communicate with a network device of a remote data center (e.g., data center 10B), SDN controller 132 may formulate and execute one or more API calls that cause gateway 108 to implement one or more communication protocols (e.g., multiprotocol border gateway protocol (MP-BGP) or Internet Protocol VPN (IP VPN)) used to communicate routing and reachability information of a tenant network of data center 10A with network devices of a remote data center. In another example, SDN controller 132 may execute API calls that cause server 12A to tunnel traffic to gateway device 108B to communicate with a tenant network of a remote data center (e.g., data center 10B).

Access control policy controller 23 may determine the one or more operations that are performed on one or more objects in network system 8 to perform the one or more functions based at least in part on tracking performance of the one or more functions in network system 8. In some examples, SDN controller 132 may generate records or logs associated the one or more functions specified by administrator 24 that access control policy controller 23 may use to determine the one or more operations that are performed on one or more objects in network system 8. For example, SDN controller 132 may, for each function specified by administrator 24, record or log the function specified by administrator 24, every object on which at least one operation is performed to perform the function, and every operation performed on objects to perform the function.

In some examples, SDN controller 132 may determine, for each of the one or more functions specified by administrator 24, every object on which at least one operation is performed to perform the function, and every operation performed on objects to perform the function. For example, SDN controller 132 may, based on a function specified by administrator 24, formulate one or more instructions (e.g., API calls) that are sent to gateway 108, chassis switches 18, TOR switches 16, servers 12, workloads 37, virtual routers 30, agents 35, forwarding components 39, virtual machines, containers, hypervisors, policies, applications, services, and the like. SDN controller 132 may determine, based on each of the one or more instructions it formulates and sends, one or more operations on one or more objects in data center 10A, and SDN controller 132 may record or log the one or more operations performed on one or more objects in data center 10A. For example, if SDN controller 132 formulates and sends an instruction to a virtual router to update a routing table, SDN controller 132 may determine that the instruction instructs the virtual router to update (i.e., write to) a flow table. Thus, SDN controller 132 may include an indication of the flow table object and an associated update operation in a record or log associated with the one or more functions specified by administrator 24.

In some examples, various components of data center 10A, such as gateway 108, chassis switches 18, TOR switches 16, servers 12, workloads 37, virtual routers 30, agents 35, forwarding components 39, virtual machines, applications, services, and the like, may send to SDN controller 132 indications of one or more operations performed by such components on one or more objects of data center 10A. For example, SDN controller 132 may, based on a function specified by administrator 24, formulate one or more instructions that are sent to one or more components of data center 10A. The one or more components of data center 10A may receive the one or more instructions from SDN controller 132 and may, based on the one or more instructions, perform one or more operations on one or more objects. Each of the components that performs at least one of the one or more instructions on at least one of the one or more objects may send, to SDN controller 132, an indication of one or more operations it performed on one or more objects. SDN controller 132 may receive the indications of one or more operations performed by one or more components of data center 10A on one or more objects and may record or log the one or more operations performed on one or more objects in data center 10A.

In some examples, one or more components of servers 12 may track the operations performed on objects by server 12 to perform the one or more instructions received from SDN controller 132 and may send indications of the operations performed on objects by server 12 to SDN controller 132. For example, one or more of agents 35, virtual routers 30, workloads 37, and the like may track the operations performed on objects in servers 12 such as one or more of agents 35, virtual routers 30, workloads 37, as well as objects within or executing within workloads 37 such as applications, services, files, and the like, and may stream events 52 indicative of operations performed on objects in servers 12 to SDN controller 132. For example, in response to server 12 performing an operation on an object, server 12 may create an event that indicates the object and the CRUD operation (i.e., either the create, read, update, or delete operation) performed on the object, and may send the event to SDN controller 132. Collector 38 of SDN controller 132 may receive the streams of events from server 12, where each event indicates an object and an operation performed on the object, and may record the received events in one or more logs, thereby tracking performance of the one or more functions in data center 10A. In addition, SDN controller 132 may generate a timestamp for each event of events that it receives and may store an association of timestamps with events in the one or more logs.

In some examples, because servers 12 may stream many different kinds of events to SDN controller 132, SDN controller 132 may limit the events being sent from server 12 to events that are relevant to determining an access control policy (e.g., events that indicate an operation performed on an object). For example, each object in data center 10A may include or be associated with an indication of whether data center 10A is currently in the process of creating an access control policy. Servers 12 may, in response to determining that data center 10A is currently in the process of creating an access policy based at least in part on the indication of whether data center 10A is currently in the process of creating an access control policy, stream only the events that are relevant to determining an access control policy.

In some examples, the indication may be in the form of a bit, where each object is associated with the bit. SDN controller 132 may operate to turn on the bits associated with the objects in data center 10A to indicate that data center 10A is currently in the process of creating an access control policy. Servers 12 may, in response to determining that data center 10A is currently in the process of creating an access policy based at least in part on the bits associated with the objects in data center 10A being set, stream only the events that are relevant to determining an access control policy.

Access control policy controller 23 may generate an access control policy for a role to perform the one or more functions specified by administrator 24 in network system 8 based at least in part on the one or more operations performed on the one or more objects in network system 8. In the examples where SDN controller 132 tracks the performance of the one or more functions specified by administrator 24 by generating records or logs associated the one or more functions specified by administrator 24, access control policy controller 23 may determine an access control policy based at least in part by the one or more operations associated with one or more objects recorded in the records or logs generated by SDN controller 132.

In some examples, access control policy controller 23 may determine the relevant one or more logs or records associated with one or more functions specified by administrator 24 based at least in part on a timestamp associated with each of the events record in one or more logs. When administrator 24 specifies one or more functions for which to create an access control policy, administrator 24 may specify a start time and an end time associated with the one or more functions. Data center 10A may perform the one or more functions during the time period between the start time and the end time associated with the one or more functions and may tag or otherwise associate a timestamp with each of the events generated during performance of the one or more functions.

An example set of timestamped events in one or more logs may be as follows:

```
time="2019-02-21T14:36:21-08:00"           level=info
    msg="Object access application-policy-set 1"
time="2019-02-21T14:36:21-08:00"           level=info
    msg="Object access project 3"
time="2019-02-21T14:36:21-08:00"           level=info
    msg="Object access virtual-network 1"
time="2019-02-21T14:36:21-08:00"           level=info
    msg="Object access routing-instance 1"
time="2019-02-21T14:36:21-08:00"           level=info
    msg="Object access virtual-network 3"
time="2019-02-21T14:36:21-08:00"           level=info
    msg="Object access virtual-network 2"
time="2019-02-21T14:36:21-08:00"           level=info
    msg="Object access virtual-network 3"
time="2019-02-21T14:36:21-08:00"           level=info
    msg="Object access virtual-network 2"
time="2019-02-21T14:36:21-08:00"           level=info
    msg="Object access virtual-network 4"
time="2019-02-21T14:36:21-08:00"           level=info
    msg="Object access routing-instance 4"
```

As can be seen in the example, each of the events may be tagged or otherwise associated with a timestamp (e.g., "2019-02-21T14:36:21-0:80"). The timestamp associated with an event may include a date (e.g., year, month, and day) and/or a time. Further, each of the events may include an indication of the object (e.g., "virtual-network") on which one or more operations were performed. In some examples, the logs may also specify the particular operations performed on an object, such as which one or more of CRUD operations were perform on a particular object. In the examples above, the numbers at the end of each line may indicate one of the four CRUD operations that is performed on the object. For example, "Object access virtual-network 1" may indicate a create operation performed on the object "virtual-network", while "Object access virtual-network 3" may indicate an "update" operation that is performed on the object "virtual-network". In this way, the one or more logs may store, for each event, an indication of an object, an indication of an operation performed on the object, and an indication of a timestamp associated with performance of the operation on the object.

Access control policy controller 23 may determine, based at least in part on one or more logs or records associated with one or more functions specified by administrator 24, one or more or more operations on one or more objects that an access control policy permits an associated role to perform. Access control policy controller 23 may include in the access control policy an indication of each of one or more objects specified in the one or more logs or records associated with one or more functions specified by administrator 24. Access control policy controller 23 may determine, for each of one or more objects specified in the one or more logs or records associated with one or more functions specified by administrator 24, one or more operations performed on the object, and may include in the access control policy for each of the one or more objects, an indication of one or more operations that can be performed on the object. Thus, for example, if the one or more logs or records indicate that both a create and a delete operation were performed on a particular object, access control policy controller 23 may include in the access control policy an indication of the particular object that is associated with an indication that a create operation and a delete operation can be performed on the object.

In some examples, access control policy controller 23 may create an access control policy file as a JavaScript Object Notation (JSON) document. For example, access control policy controller 23 may create an access control policy file, such as by using the following example command: python rbac.py apisrv.log template.json developer. In this example, access control policy controller 23 may create an access control policy file "template.json" for a "developer" role based on the log file "apisrv.log" that specifies one or more operations performed on one or more objects. A partial output of the example access control policy file is as follows:

```
{
  "api-access-list": {
    "api_access_list_entries": {
      "rbac_rule": [
        {
          "rule_object": "domain",
          "rule_perms": [
            {
              "role_crud": "CRD",
              "role_name": "developer"
            }
          ]
        },
        {
          "rule_object": "contrail-cluster",
          "rule_perms": [
            {
              "role_crud": "CRD",
              "role_name": "developer"
            }
          ]
        },
        {
          "rule_object": "service-instance",
          "rule_perms": [
            {
              "role_crud": "CD",
              "role_name": "developer"
```

-continued

```
      }
    ]
  },
```

As can be seen in the above example, an access control policy file may specify one or more objects of network system 8 on which the access control policy applies. The access control policy file may, for each specified object, specify one or more of the CRUD operations that the access control policy permits a role to perform on the object. Further, the access control policy file may, for each specified object and the one or more CRUD operations that can be performed on the object, the role that is permitted to perform the specified one or more CRUD operations on the specified object. For example, for a "domain" object in network system 8, the access control policy permits a role "developer" to perform create, read, and delete ("CRD") operations on the "domain" object. For a "contrail-cluster" object in network system 8, the access control policy permits a role "developer" to perform create, read, and delete ("CRD") operations on the "contrail-cluster" object. For a "service-instance" object in network system 8, the access control policy permits a role "developer" to perform create and delete ("CD") operations on the "service-instance" object.

In some examples, access control policy controller 23 may output, via user interface device 129, the access control policy specified by the access control policy file to viewing by a user, such as administrator 24 so that the user may confirm that the access control policy is correct and/or so that the user may provide changes to the access control policy file via providing user input via user interface device 129. Access control policy controller 23 may generate an access control policy for a role based on the access control policy file upon receiving confirmation of the access control policy from the user via user interface device 129.

In some examples, access control policy controller 23 may create the access control policy for a role from the generated access control policy file, such as by performing the following example command: curl -vX POST http://10.0.0.1:8082/api-access-lists -d @api_access_list.json -header "Content-Type: application/json". Once access control policy controller 23 creates the access control policy for the role, access control policy controller 23 may store the access policy so that it may be applied to users that are assigned the role associated with the access control policy to restrict the user's access within network system 8. For example, administrator 24 may interact with user interface device 129 to assign a role to a user, and access control policy controller 23 may, in response, apply the access control policy associated with the role to the user to restrict the user's access within network system 8 to performing the one or more operations on the one or more objects specified by the access control policy associated with the role.

Figure 2:
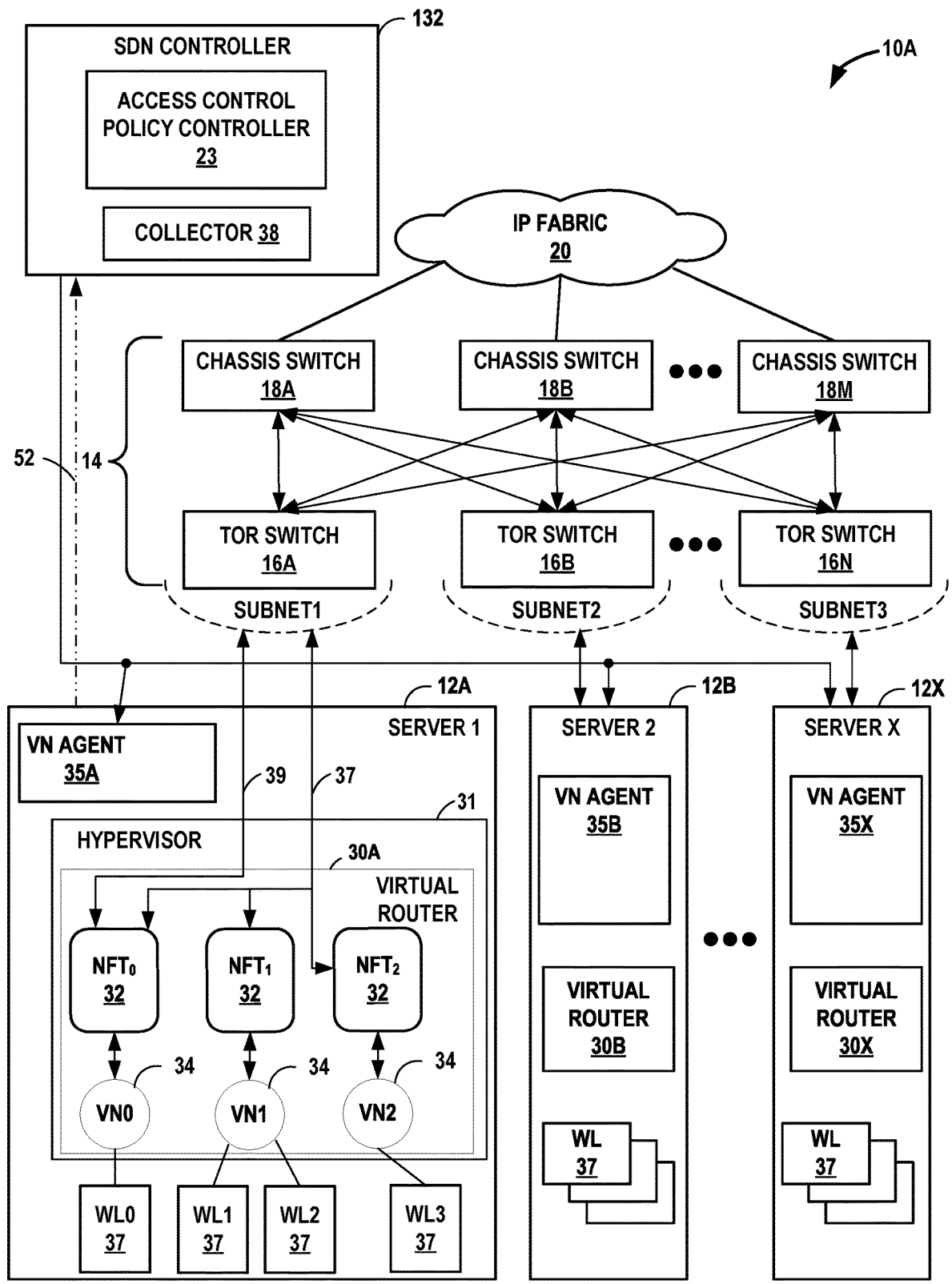
FIG. 2 is a block diagram illustrating an example implementation of a data center of FIG. 1 in further detail.

FIG. 2 is a block diagram illustrating an example implementation of data center 10A of FIG. 1 in further detail. In the example of FIG. 2, data center 10A includes interconnections that extend switch fabric 14 from physical switches 16, 18 to software or "virtual" routers 30A-30X (again, collectively "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme.

Each virtual router 30 may execute within a hypervisor, a host operating system or other component of each of servers 12. Each of servers 12 may represent an x86 or other general-purpose or special-purpose server capable of executing workloads 37. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more workloads (WLs) 37 on top of the virtualization platform provided by hypervisor 31. Each of workloads 37 is associated with one of the virtual networks VN0-VN1 and may represent tenant workloads running customer applications such as Web servers, database servers, enterprise applications, or hosting virtualized services used to create service chains. In some cases, any one or more of servers 12 or another computing device may host customer applications directly, i.e., not as virtual machines. In some cases, some of workloads 37 may represent containers, another form of virtualized execution environment. That is, both virtual machines and containers are examples of virtualized execution environments for executing workloads.

In general, each workload of workloads 37 may be any type of software application and may execute on a virtualized environment, e.g., a virtual machine or container, that is assigned a virtual address for use within a corresponding virtual network 34, where each of the virtual networks may be a different virtual subnet provided by virtual router 30A. A virtualized environment may be assigned its own virtual layer three (L3) IP address, for example, for sending and receiving communications but may be unaware of an IP address of the physical server 12A on which the virtualized environment is executing. In this way, a "virtual address" is an address that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with SDN controller 132, which generates commands to control routing of packets through data center 10A. VN agents 35 may operate as a proxy for control plane messages between workloads 37 and SDN controller 132. For example, a WL 37 may request to send a message using its virtual address via the VN agent 35A, and VN agent 35A may in turn send the message and request that a response to the message be received for the virtual address of the workload 37 that originated the first message. In some cases, a workload 37 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by workloads 37 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, SDN controller 132 provides a logically centralized controller for facilitating operation of one or more virtual networks within data center 10A. SDN controller 132 may, for example, maintain a routing information base, e.g., one or more routing tables that store routing information for the physical network as well as one or more overlay networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each of virtual networks 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with aspects of the present disclosure, access control policy controller 23 is configured to receive a request to create an access control policy that permits a role to perform one or more functions in data center 10A and, in response, to generate the access control policy that permits the role to perform the one or more functions in data center 10A. In some example, SDN controller 132 includes access control policy controller 23 that may generate the access control policy that permits the role to perform the one or more functions in data center 10A. In general, processing circuitry of a network device such as one or more servers 12 may execute access control policy controller 23 to perform the techniques of access control policy controller 23 described throughout this disclosure, and access control policy controller 23 may store access control policies that it generates into memory that is operably coupled to the processing circuitry on which access control policy controller 23 executes. In some examples, SDN controller 132 and access control policy controller 23 may execute on the same computing devices (e.g., one of servers 12). In some examples, SDN controller 132 and access control policy controller 23 may execute on different computing devices (e.g., different ones of servers 12 or on different servers of different data centers 10 in network system 8).

SDN controller 132 may receive the request to perform one or more functions and may, in response, formulate one or more instructions for servers 12 to perform the one or more functions. SDN controller 132 may send the formulated one or more instructions to servers 12, and servers 12 may perform the one or more instructions. For example, SDN controller 132 may formulate and execute one or more API calls that causes data center to perform the one or more functions.

SDN controller 132 is further configured to determine one or more operations performed on one or more objects in data center 10A to perform the one or more functions based at least in part on tracking performance of the one or more functions in data center 10A. As described above, SDN controller 132 may formulate one or more instructions for servers 12 to perform the one or more functions and may send the formulated one or more instructions to servers 12 and servers 12 may perform the one or more instructions. As servers 12 performs the one or more instructions, thereby performing the one or more functions specified in the request to create the access control policy for the role, access control policy controller 23 may execute to track the operations that servers 12 perform on objects in servers 12

In some examples, one or more components of servers 12 may track the operations performed on objects by servers 12 to perform the one or more instructions received from SDN controller 132 and may send indications of the operations performed on objects by server 12 to SDN controller 132. For example, one or more of agents 35, virtual routers 30, hypervisors 31, NFTs 32, virtual networks 34, workloads 37, and the like may track the operations performed on objects in servers 12 such as virtual routers 30, hypervisors 31, NFTs 32, virtual networks 34, workloads 37, as well as objects within workloads 37 such as applications, services, files, and the like, and may stream events 52 indicative of operations performed on objects in servers 12 to collector 38 of SDN controller 132. For example, in response to server 12 performing an operation on an object, server 12 may create an event that indicates the object and the CRUD operation (i.e., either the create, read, update, or delete operation) performed on the object, and may send the event to SDN controller 132. Collector 38 of SDN controller 132 may receive the streams of events 52 from server 12, where each event indicates an object and an operation performed on the object, and may execute to record the received events 52 in one or more logs.

In some examples, SDN controller 132 may maintain one or more logs of the events 52 streamed from servers 12 during performance of the one or more functions specified by the request to create an access control policy for a role. For example, for each event of events 52 received by collector 38 from servers 12, where each event specifies an object and an operation (e.g., one of the CRUD operations) performed on the object, SDN controller 132 may create a log entry for the event that specifies the operation specified by the event, the object specified by the event, and a timestamp associated with the event. In some examples, if the event is indicative of an operation performed on an object during performance of a user intent specified by the request to create an access control policy, the SDN controller 132 may also include, in the log, an indication of the user intent, such as an user intent identifier associated with the operation and the object.

Access control policy controller 23 is configured to create the access control policy for the role that permits the role to perform the one or more operations on the one or more objects in data center 10A. Access control policy controller 23 may create the access control policy based on the logs maintained by SDN controller 132. In particular, access control policy controller 23 may create an access control policy for the role that permits the role to perform the one or more operations on the one or more objects indicated by the one or more logs as discussed above. For example, access control policy controller 23 may create an access policy that indicates each object that was accessed and that indicates, for each object, one or more operations performed on the object.

In some examples, access control policy controller 23 may execute to determine the logs and/or representations of objects associated with a request to create an access control policy based at least in part on timestamps that are associated with the one or more logs and/or events that are logged by the one or more logs. As discussed above, when SDN controller 132 receives an event from servers 12 during performance of one or more functions specified by the request to create the access policy, SDN controller 132 may associate a timestamp with the event and may store an association of the timestamp and the event in one or more logs.

The request to create the access policy may specify a time period, such as by specifying a start time and an end time, and access control policy controller 23 may determine the one or more logs and/or events in the one or more logs associated with the request to create the access policy based at least in part on the time period specified by the request to create the access policy and the timestamps associated with the one or more logs and/or events in the one or more logs. For example, access control policy controller 23 may execute to determine, based on the associated timestamps, one or more logs and/or one or more events in the one or more logs that are associated with the request to create the access policy based on the timestamps associated with the one or more logs and/or events in the one or more logs falling within the time period specified by the request to create the access policy. Access control policy controller 23 may therefore generate the requested access policy based at least in part on the one or more logs and/or events in the one or more logs that are associated with the request.

Figure 3:
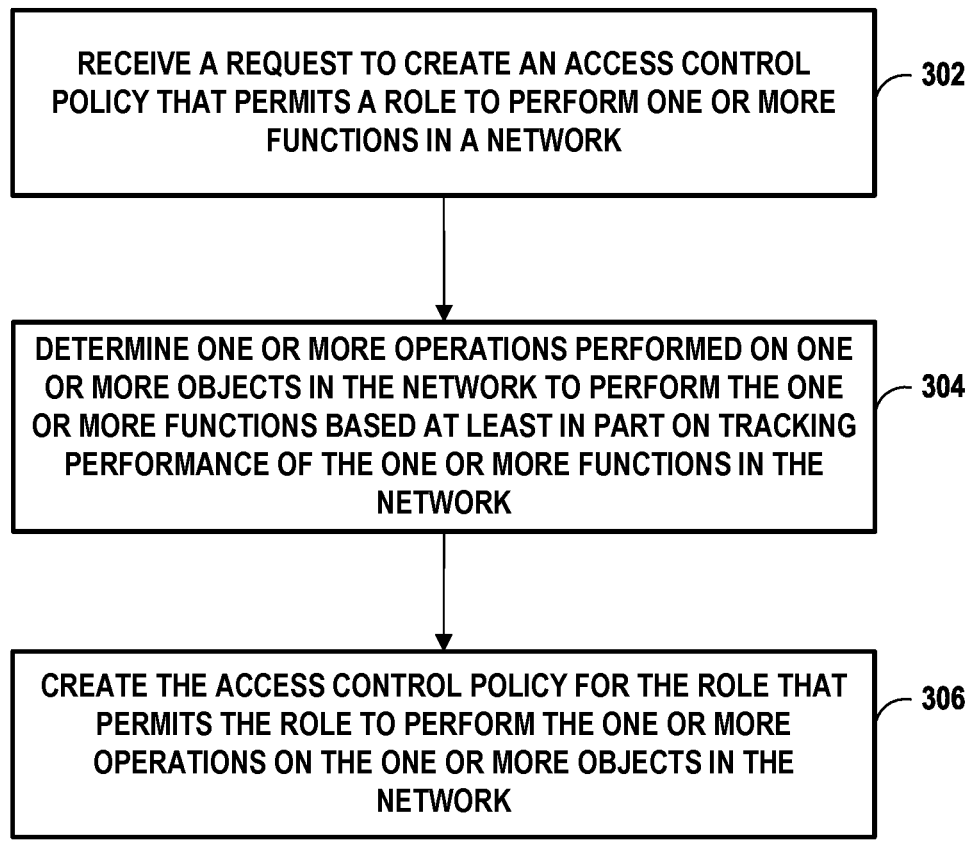
FIG. 3 is a flowchart illustrating an example operation of an access control policy controller in accordance with the techniques of the present disclosure.

FIG. 3 is a flowchart illustrating an example operation of an access control policy controller in accordance with the techniques of the present disclosure. For convenience, FIG. 3 is described with respect to FIGS. 1 and 2. In the example of FIG. 5, access control policy controller 23 may receive a request to create an access control policy that permits a role to perform one or more functions in a network system 8 (302). For example, access control policy controller 23 may receive indications of one or more user intents that indicate the one or more functions that the role is permitted to perform in the network system 8.

Access control policy controller 23 may determine one or more operations performed on one or more objects in the network system 8 to perform the one or more functions based at least in part on tracking performance of the one or more functions in the network system 8 (304). In some examples, to determine the one or more operations performed on the one or more objects in the network to perform the one or more functions based at least in part on tracking the performance of the one or more functions in the network, access control policy controller 23 may determine, based at least on one or more logs generated from performing the one or more functions in the network system 8, the one or more operations performed on the one or more objects in the network system 8. In some examples, the one or more logs comprise indications of a plurality of events 52 streamed from one or more servers 12 of the network system 8, and each of the plurality of events 52 indicate an operation performed on an object in the one or more servers 12 of the network system 8.

In some examples, each of the plurality of events 52 is associated with a timestamp in the one or more logs. In some examples, to receive the request to create the access control policy that permits the role to perform the one or more functions in a network system 8, access control policy controller 23 may receive an indication of a time period associated with the performance of the one or more functions in the network system 8. In some examples, to determine, based at least on the one or more logs generated from the performance of the one or more functions in the network system 8, the one or more operations performed on the one or more objects in the network system 8, access control policy controller 23 may determine one or more events out of a plurality of events based at least in part on one or more timestamps associated with the one or more events indicating that the one or more events were generated from performing the one or more functions in the network within the time period.

Access control policy controller 23 may determine create the access control policy for the role that permits the role to perform the one or more operations on the one or more objects in the network system 8 (306). In some examples, each of the one or more operations performed on the one or more objects comprise one or more of create, read, update, and delete (CRUD) operations, and to generate the access control policy for the role that permits the role to perform the one or more operations on the one or more objects in the network system 8, access control policy controller 23 may generate the access control policy for the role that includes an indication of each of the one or more objects and includes, for each respective object of the one or more objects, an indication of one or more of the CRUD operations that the role is permitted to perform for the respective object.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The invention claimed is:

1. A method comprising:
receiving, with a controller, a request to create an access control policy that permits a role to perform one or more functions associated with management or configuration of a network;
determining, with the controller, one or more specific operations performed on one or more specific identified network objects in the network, the one or more specific identified network objects including a configuration object for configuring the network, and the one or more specific operations being performed on the one or more specific identified network objects to perform the one or more functions in response to receiving the request, based at least in part on tracking performance of the one or more functions in the network; and
creating, with the controller, the access control policy that permits the role to perform the one or more specific operations on the one or more specific identified network objects in the network.

2. The method of claim 1, wherein determining the one or more specific operations performed on the one or more specific identified network objects in the network to perform the one or more functions based at least in part on tracking the performance of the one or more functions in the network comprises:
determining, based at least on one or more logs generated from performing the one or more functions in the network, the one or more specific operations performed on the one or more specific identified network objects in the network.

3. The method of claim 2, wherein:
the one or more logs comprise indications of a plurality of events streamed from one or more servers of the network, and
each of the plurality of events indicates an operation performed on a network object in the one or more servers of the network.

4. The method of claim 3,
wherein each of the plurality of events is associated with a timestamp in the one or more logs;
wherein receiving the request to create the access control policy that permits the role to perform the one or more functions associated with management or configuration of the network comprises receiving an indication of a time period associated with the performance of the one or more functions in the network; and
wherein determining, based at least on the one or more logs generated from the performance of the one or more functions in the network, the one or more specific operations performed on the one or more specific identified network objects in the network comprises determining one or more events out of a plurality of events based at least in part on one or more timestamps associated with the one or more events indicating that the one or more events were generated from performing the one or more functions in the network within the time period.

5. The method of claim 1, wherein each of the one or more specific operations performed on the one or more specific identified network objects comprise one or more of create, read, update, and delete (CRUD) operations.

6. The method of claim 5, wherein generating the access control policy that permits the role to perform the one or more specific operations on the one or more specific identified network objects in the network comprises:
generating the access control policy to include an indication of each of the one or more specific identified network objects and include, for each network object of the one or more specific identified network objects, an indication of the one or more of CRUD operations that the role is permitted to perform for the network object.

7. The method of claim 1, wherein receiving the request to create the access control policy that permits the role to perform the one or more functions in a network comprises:
receiving indications of one or more user intents that indicate the one or more functions that the role is permitted to perform in the network.

8. A device comprising:
memory configured to store one or more access control policies; and
processing circuitry operably coupled to the memory and configured to:
receive a request to create an access control policy that permits a role to perform one or more functions associated with management or configuration of a network;
determine one or more specific operations performed on one or more specific identified network objects in the network, the one or more specific identified network objects including a configuration object for configuring the network, and the one or more specific operations being performed on the one or more specific identified network objects to perform the one or more functions in response to receiving the request, based at least in part on tracking performance of the one or more functions in the network; and
create the access control policy that permits the role to perform the one or more specific operations on the one or more specific identified network objects in the network.

9. The device of claim 8, wherein to determine the one or more specific operations performed on the one or more specific identified network objects in the network to perform the one or more functions based at least in part on tracking the performance of the one or more functions in the network, the processing circuitry is further configured to:
determine, based at least on one or more logs generated from performing the one or more functions in the network, the one or more specific operations performed on the one or more specific identified network objects in the network.

10. The device of claim 9, wherein:
the one or more logs comprise indications of a plurality of events streamed from one or more servers of the network, and
each of the plurality of events indicate an operation performed on a network object in the one or more servers of the network.

11. The device of claim 10,
wherein each of the plurality of events is associated with a timestamp in the one or more logs;
wherein to receive the request to create the access control policy that permits the role to perform the one or more functions associated with management or configuration of the network, the processing circuitry is further configured to receive an indication of a time period associated with the performance of the one or more functions in the network; and wherein to determine, based at least on the one or more logs generated from the performance of the one or more functions in the network, the one or more specific operations performed on the one or more specific identified network objects in the network, the processing circuitry is further configured to determine one or more events out of a plurality of events based at least in part on one or more timestamps associated with the one or more events indicating that the one or more events were generated from performing the one or more functions in the network within the time period.

12. The device of claim 8, wherein each of the one or more specific operations performed on the one or more specific identified network objects comprise one or more of create, read, update, and delete (CRUD) operations.

13. The device of claim 12, wherein to generate the access control policy that permits the role to perform the one or more specific operations on the one or more specific identified network objects in the network, the processing circuitry is further configured to:

generate the access control policy to include an indication of each of the one or more specific identified network objects and includes, for each network object of the one or more specific identified network objects, an indication of the one or more of CRUD operations that the role is permitted to perform for the network object.

14. The device of claim 8, wherein to receive the request to create the access control policy that permits the role to perform the one or more functions in a network, the processing circuitry is further configured to:

receive indications of one or more user intents that indicate the one or more functions that the role is permitted to perform in the network.

15. A non-transitory computer-readable medium comprising instructions that, when executed, cause processing circuitry executing a controller for a network to:

receive a request to create an access control policy that permits a role to perform one or more functions associated with management or configuration of the network;

determine one or more specific operations performed on one or more specific identified network objects in the network, the one or more specific identified network objects including a configuration object for configuring the network, and the one or more specific operations being performed on the one or more specific identified network objects to perform the one or more functions in response to receiving the request, based at least in part on tracking performance of the one or more functions in the network; and create the access control policy that permits the role to perform the one or more specific operations on the one or more specific identified network objects in the network.

16. The computer-readable medium of claim 15, wherein the instructions that, when executed, cause the processing circuitry to determine the one or more specific operations performed on the one or more specific identified network objects in the network to perform the one or more functions based at least in part on tracking the performance of the one or more functions in the network further cause the processing circuitry to:

determine, based at least on one or more logs generated from performing the one or more functions in the network, the one or more specific operations performed on the one or more specific identified network objects in the network.

17. The computer-readable medium of claim 16, wherein:

the one or more logs comprise indications of a plurality of events streamed from one or more servers of the network, and each of the plurality of events indicate an operation performed on a network object in the one or more servers of the network.

18. The computer-readable medium of claim 17, wherein each of the plurality of events is associated with a timestamp in the one or more logs;

wherein the instructions that, when executed, cause the processing circuitry to receive the request to create the access control policy that permits the role to perform the one or more functions associated with management or configuration of the network further cause the processing circuitry to receive an indication of a time period associated with the performance of the one or more functions in the network; and wherein the instructions that, when executed, cause the processing circuitry to determine, based at least on the one or more logs generated from the performance of the one or more functions in the network, the one or more specific operations performed on the one or more specific identified network objects in the network further cause the processing circuitry to determine one or more events out of a plurality of events based at least in part on one or more timestamps associated with the one or more events indicating that the one or more events were generated from performing the one or more functions in the network within the time period.

19. The computer-readable medium of claim 15, wherein each of the one or more specific operations performed on the one or more specific identified network objects comprise one or more of create, read, update, and delete (CRUD) operations.

20. The computer-readable medium of claim 15, wherein the instructions that, when executed, cause the processing circuitry to generate the access control policy that permits the role to perform the one or more specific operations on the one or more specific identified network objects in the network further cause the processing circuitry to:

generate the access control policy to include an indication of each of the one or more specific identified network objects and includes, for each network object of the one or more specific identified network objects, an indication of the one or more of CRUD operations that the role is permitted to perform for the network object.

* * * * *